US008595686B2

(12) United States Patent
Koyama

(10) Patent No.: US 8,595,686 B2
(45) Date of Patent: Nov. 26, 2013

(54) SOFTWARE MODIFICATION ESTIMATE METHOD AND SOFTWARE MODIFICATION ESTIMATE SYSTEM

(75) Inventor: Shigeru Koyama, Tokyo (JP)

(73) Assignee: Jastec Co., Ltd., Minato-ku (JP)

( * ) Notice: Subject to any disclaimer, the term of this patent is extended or adjusted under 35 U.S.C. 154(b) by 293 days.

(21) Appl. No.: 13/131,417

(22) PCT Filed: Nov. 26, 2008

(86) PCT No.: PCT/JP2008/071476
§ 371 (c)(1),
(2), (4) Date: Aug. 3, 2011

(87) PCT Pub. No.: WO2010/061440
PCT Pub. Date: Jun. 3, 2010

(65) Prior Publication Data
US 2011/0289473 A1    Nov. 24, 2011

(51) Int. Cl.
*G06F 9/44*        (2006.01)
(52) U.S. Cl.
USPC ............................. 717/101; 717/102; 717/121
(58) Field of Classification Search
None
See application file for complete search history.

(56) References Cited

U.S. PATENT DOCUMENTS

| 6,996,811 | B2* | 2/2006 | Nishioka et al. | 717/120 |
| 7,124,400 | B2* | 10/2006 | Mortensen et al. | 717/121 |
| 7,849,438 | B1* | 12/2010 | Hemmat et al. | 717/102 |
| 7,890,924 | B2* | 2/2011 | Raffo | 717/105 |
| 7,971,180 | B2* | 6/2011 | Kreamer et al. | 717/120 |
| 8,006,223 | B2* | 8/2011 | Boulineau et al. | 717/120 |
| 8,418,123 | B2* | 4/2013 | Kamiyama et al. | 717/120 |
| 8,484,065 | B1* | 7/2013 | Arredondo et al. | 717/102 |
| 2003/0018952 | A1* | 1/2003 | Roetzheim | 717/101 |
| 2003/0070157 | A1* | 4/2003 | Adams et al. | 717/101 |

(Continued)

FOREIGN PATENT DOCUMENTS

| JP | 2004-038490 A | 2/2004 |
| JP | 2006-039603 A | 2/2006 |
| JP | 2006-085663 A | 3/2006 |
| JP | 2007-323226 A | 12/2007 |

OTHER PUBLICATIONS

Yau, S.S.; Collofello, J.S.; MacGregor, T., Ripple effect analysis of software maintenance, Computer Software and Applications Conference, 1978. COMPSAC '78. [Retrieved from the Internet] <http://ieeexplore.ieee.org/stamp/stamp.jsp?tp=&arnumber=810308> pp. 60-65.*

(Continued)

*Primary Examiner* — Thuy Dao
*Assistant Examiner* — Ravi K Sinha
(74) *Attorney, Agent, or Firm* — McGlew and Tuttle, P.C.

(57) ABSTRACT

The subject matter is directed to a software modification estimate method and a software modification estimate system that make it possible to assemble a modification development plan prior to modification work on existing software. The software modification estimate method and the software modification estimate system are provided with an input and output means (1) that inputs and outputs information on the modification of existing software, a modification estimate calculation means (2) that analyzes a modification requirement based on the information received from the input and output means and numerically calculates the fluctuation of productivity in the modification, and a database (3) that stores data necessary for the analysis and that holds the analyzed result. Thus, it is possible to estimate total steps required for the modification of the software at a preparation stage.

15 Claims, 3 Drawing Sheets

(56) References Cited

U.S. PATENT DOCUMENTS

| | | | | |
|---|---|---|---|---|
| 2003/0192029 | A1* | 10/2003 | Hughes | 717/102 |
| 2004/0003369 | A1* | 1/2004 | Gonos | 717/100 |
| 2004/0010772 | A1* | 1/2004 | McKenna et al. | 717/120 |
| 2004/0143811 | A1* | 7/2004 | Kaelicke et al. | 717/120 |
| 2004/0221256 | A1* | 11/2004 | Martin et al. | 717/101 |
| 2004/0230964 | A1* | 11/2004 | Waugh et al. | 717/120 |
| 2005/0114830 | A1* | 5/2005 | Knutson et al. | 717/102 |
| 2005/0138599 | A1* | 6/2005 | Hazzard et al. | 717/101 |
| 2005/0188344 | A1* | 8/2005 | McKethan | 717/101 |
| 2005/0216890 | A1* | 9/2005 | Sundararajan et al. | 717/120 |
| 2008/0028362 | A1* | 1/2008 | Ugai et al. | 717/101 |
| 2008/0059942 | A1* | 3/2008 | Brown et al. | 717/101 |
| 2008/0313595 | A1* | 12/2008 | Boulineau et al. | 717/101 |
| 2008/0313598 | A1* | 12/2008 | Frasher et al. | 717/101 |
| 2010/0064277 | A1* | 3/2010 | Baird et al. | 717/120 |
| 2012/0131540 | A1* | 5/2012 | Mendis | 717/101 |

OTHER PUBLICATIONS

Basili, V.R., Viewing maintenance as reuse-oriented software development, Software IEEE vol. 7 No. 1 Jan. 1990, [Retrieved from the Internet] <http://ieeexplore.ieee.org/stamp/stamp.jsp?tp=&anumber=43045> pp. 19-25.*

Black, S. ,Computing ripple effect for software maintenance, [Online] Jul. 2001, J. Softw. Maint. Evol.: Res. Pract. vol. 13 issue 4, [Retrieved from the Internet] <http://onlinelibrary.wiley.com/doi/10.1002/smr.233/pdf> pp. 263-279.*

Sherif, J.S.; Hops, J.M., Development and application of composite complexity models and a relative complexity metric in a software maintenance environment, Oct. 1996 WESCON/96, [Retrieved from the Internet] <http://ieeexplore.ieee.org/stamp/stamp.jsp?tp=&arnumber=554559&isnumber=12038> pp. 514-526.*

Mohagheghi et al., Effort estimation of use cases for incremental large-scale software development, [Online] in Proceedings of the 27th international conference on Software engineering (ICSE '05) 2005, [Retrieved from the Internet] <http://delivery.acm.org/10.1145/1070000/1062516/p303-mohagheghi.pdf> pp. 303-311.*

Onishi et al., "Metrics ni yoru kumikomi-gata software kaihatsu no hyōka," Information Processing Society of Japan Kenkyū Hōkoku, Sep. 8, 1994, vol. 94, No. 73, pp. 89-96, 94-SE-100-12.

Wasano et al., "Software no kinō henkō to ishoku ni okeru seisansei model," The Transactions of the Institute of Electronics, Information and Communication Engineers, Aug. 25, 1994, vol. J77-D-I, No. 8 pp. 567-576.

* cited by examiner

| MODIFICATION DISTRIBUTION DEGREE NUMBER (j) | | MODIFICATION DENSITY NUMBER (i) | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| 1 | 1-YEAR PROFICIENCY MODIFICATION SCALE (v:111) | 1.15KS | 2.65KS | | | | | 2.88KS | | | | | | | | | | | | |
| | 2-YEAR PROFICIENCY MODIFICATION SCALE (v:112) | | | | | | | 2.88KS | | | | | | | | | | | | |
| | 3-YEAR PROFICIENCY MODIFICATION SCALE (v:113) | | | | | | | 2.88KS | | | | | | | | | | | | |
| | 1-YEAR PROFICIENCY COEFFICIENT (k:111) | 1.00 | 0.96 | 0.91 | 0.87 | 0.92 | 0.78 | 0.73 | 0.69 | 0.64 | 0.60 | 0.56 | 0.51 | 0.47 | 0.42 | 0.38 | 0.33 | 0.29 | 0.24 | 0.20 |
| | 2-YEAR PROFICIENCY COEFFICIENT (k:112) | 0.50 | 0.48 | 0.46 | 0.43 | 0.41 | 0.39 | 0.37 | 0.34 | 0.32 | 0.30 | 0.28 | 0.26 | 0.23 | 0.21 | 0.19 | 0.17 | 0.14 | 0.12 | 0.10 |
| | 3-YEAR PROFICIENCY COEFFICIENT (k:113) | -0.20 | -0.19 | -0.18 | -0.17 | -0.16 | -0.14 | -0.13 | -0.12 | -0.11 | -0.10 | -0.09 | -0.08 | -0.07 | -0.06 | -0.04 | -0.03 | -0.02 | -0.01 | 0.00 |
| | 1-YEAR PROFICIENCY MAN-HOUR (v:111x) | 124H | | | | | | 270H | | | | | | | | | | | | |
| | 2-YEAR PROFICIENCY MAN-HOUR (v:112x) | | 203H | | | | | 213H | | | | | | | | | | | | |
| | 3-YEAR PROFICIENCY MAN-HOUR (v:113x) | | | | | | | 135H | | | | | | | | | | | | |
| 2 | 1-YEAR PROFICIENCY MODIFICATION SCALE (v:121) | | 1.28KS | | | | | | 7.66KS | | | | | | | | | | | |
| | 2-YEAR PROFICIENCY MODIFICATION SCALE (v:122) | | | 2.88KS | | | | | 7.66KS | | | | | | | | | | | |
| | 3-YEAR PROFICIENCY MODIFICATION SCALE (v:123) | | | | 4.93KS | | | | 7.66KS | | | | | | | | | | | |
| | 1-YEAR PROFICIENCY COEFFICIENT (k:121) | 0.83 | 0.79 | 0.76 | 0.72 | 0.68 | 0.64 | 0.60 | 0.56 | 0.52 | 0.48 | 0.44 | 0.41 | 0.37 | 0.33 | 0.29 | 0.25 | 0.21 | 0.17 | 0.13 |
| | 2-YEAR PROFICIENCY COEFFICIENT (k:122) | 0.40 | 0.38 | 0.36 | 0.34 | 0.33 | 0.31 | 0.29 | 0.27 | 0.25 | 0.23 | 0.21 | 0.20 | 0.18 | 0.16 | 0.14 | 0.12 | 0.10 | 0.09 | 0.07 |
| | 3-YEAR PROFICIENCY COEFFICIENT (k:123) | -0.20 | -0.19 | -0.18 | -0.17 | -0.16 | -0.14 | -0.13 | -0.12 | -0.11 | -0.10 | -0.09 | -0.08 | -0.07 | -0.06 | -0.04 | -0.03 | -0.02 | -0.01 | 0.00 |
| | 1-YEAR PROFICIENCY MAN-HOUR (v:121x) | | 124H | | | | | | 646H | | | | | | | | | | | |
| | 2-YEAR PROFICIENCY MAN-HOUR (v:122x) | | | 212H | | | | | 525H | | | | | | | | | | | |
| | 3-YEAR PROFICIENCY MAN-HOUR (v:123x) | | | | 222H | | | | 363H | | | | | | | | | | | |
| 3 | 1-YEAR PROFICIENCY MODIFICATION SCALE (v:131) | | | 1.44KS | | | | | | 17.25KS | | | | | | | | | | |
| | 2-YEAR PROFICIENCY MODIFICATION SCALE (v:132) | | | | 3.28KS | | | | | 17.25KS | | | | | | | | | | |
| | 3-YEAR PROFICIENCY MODIFICATION SCALE (v:133) | | | | | 5.76KS | | | | 17.25KS | | | | | | | | | | |
| | 1-YEAR PROFICIENCY COEFFICIENT (k:131) | 0.67 | 0.63 | 0.60 | 0.57 | 0.53 | 0.50 | 0.47 | 0.43 | 0.40 | 0.37 | 0.33 | 0.30 | 0.27 | 0.23 | 0.20 | 0.17 | 0.13 | 0.10 | 0.07 |
| | 2-YEAR PROFICIENCY COEFFICIENT (k:132) | 0.30 | 0.29 | 0.27 | 0.26 | 0.24 | 0.23 | 0.21 | 0.20 | 0.18 | 0.17 | 0.15 | 0.14 | 0.12 | 0.11 | 0.09 | 0.08 | 0.06 | 0.05 | 0.03 |
| | 3-YEAR PROFICIENCY COEFFICIENT (k:133) | -0.20 | -0.19 | -0.18 | -0.17 | -0.16 | -0.14 | -0.13 | -0.12 | -0.11 | -0.10 | -0.09 | -0.08 | -0.07 | -0.06 | -0.04 | -0.03 | -0.02 | -0.01 | 0.00 |
| | 1-YEAR PROFICIENCY MAN-HOUR (v:131x) | | | | | 263H | | | | 1,304H | | | | | | | | | | |
| | 2-YEAR PROFICIENCY MAN-HOUR (v:132x) | | | | 223H | | | | | 1,101H | | | | | | | | | | |
| | 3-YEAR PROFICIENCY MAN-HOUR (v:133x) | | | 124H | | | | | | 828H | | | | | | | | | | |
| 4 | 1-YEAR PROFICIENCY MODIFICATION SCALE (v:141) | | | | 1.64KS | | | | | | 46.00KS | | | | | | | | | 11.50KS |
| | 2-YEAR PROFICIENCY MODIFICATION SCALE (v:142) | | | | | 3.84KS | | | | | 45.00KS | | | | | | | | 28.75KS | |
| | 3-YEAR PROFICIENCY MODIFICATION SCALE (v:143) | | | | | | 6.90KS | | | | 46.00KS | | | | | | | 38.33KS | | |
| | 1-YEAR PROFICIENCY COEFFICIENT (k:141) | 0.50 | 0.47 | 0.44 | 0.42 | 0.39 | 0.36 | 0.33 | 0.31 | 0.28 | 0.25 | 0.22 | 0.19 | 0.17 | 0.14 | 0.11 | 0.08 | 0.06 | 0.03 | 0.00 |
| | 2-YEAR PROFICIENCY COEFFICIENT (k:142) | 0.20 | 0.19 | 0.18 | 0.17 | 0.16 | 0.14 | 0.13 | 0.12 | 0.11 | 0.10 | 0.09 | 0.08 | 0.07 | 0.06 | 0.04 | 0.03 | 0.02 | 0.01 | 0.00 |
| | 3-YEAR PROFICIENCY COEFFICIENT (k:143) | -0.20 | -0.19 | -0.18 | -0.17 | -0.18 | -0.14 | -0.13 | -0.12 | -0.11 | -0.10 | -0.09 | -0.09 | -0.07 | -0.06 | -0.04 | -0.03 | -0.02 | -0.01 | 0.00 |
| | 1-YEAR PROFICIENCY MAN-HOUR (v:141x) | | | | | | | | | | 3,105H | | | | | | | | | 621H |
| | 2-YEAR PROFICIENCY MAN-HOUR (v:142x) | | | | | | 319H | | | | 2,732H | | | | | | | 2,024H | 1,670H | |
| | 3-YEAR PROFICIENCY MAN-HOUR (v:143x) | | | | | | | | | | 2,236H | | | | | | | | | |

US 8,595,686 B2

SOFTWARE MODIFICATION ESTIMATE METHOD AND SOFTWARE MODIFICATION ESTIMATE SYSTEM

TECHNICAL FIELD

The present invention relates to a software modification estimate method and a software modification estimate system for estimating total man hours required for modification of existing software.

BACKGROUND ART

When changing the specification of existing software or adding new functions to existing software, modifying existing software allows cutbacks in money and man hours as compared with developing new software. For such a reason, the functionality change of software is usually done in a manner of modifying existing software.

DISCLOSURE OF THE INVENTION

Problems to be Solved by the Invention

In modification development to change a part or a plurality of parts of existing software, effort and cost vary depending on preliminary survey of the software, a work scale, a work environment, and a dispersion of modified parts over the entire software even if the addition scales or deletion scales are actually the same.

That is, in development of the modification type software, a test scale depends on how many periphery functions are involved in the modification. Therefore, the productivity is not proportional to a modification amount. This makes it difficult to estimate the total man hours of modification in an easy way.

Principal objects to be obtained by the invention are as follows.

That is, a first object of the invention is to provide a software modification estimate method and a software modification estimate system that allows building a modification development plan prior to modification work on existing software.

A second object of the invention is to provide a software modification estimate method and a software modification estimate system that makes it possible to estimate total man hours of modification taking into consideration a work scale, a dispersion of modified parts, and the years of experience of modification base software in modifying existing software.

A third object of the invention is to provide a software modification estimate method and a software modification estimate system that allows an accurate estimation of a modification change on each occasion when frequent changes to the modification contents are made in modifying existing software.

Means for Solving the Problems

A system according to the invention is devised to resolve the above-mentioned problems. The system is devised by providing software modification estimate means that includes input/output means configured to perform input and output of information regarding modification of existing software, modification estimate calculation means configured to analyze a modification requirement based on the information received through the input/output means and numerically calculating a fluctuation in productivity of the modification, and a database configured to hold therein data necessary for the analysis and an analysis result.

A software modification estimate method according to the invention includes generating a modification scale distribution table that indicates a distribution of modification scales of modification based on information received through data input by a user of the system using input/output means; deriving a modification distribution number obtained by quantifying the modification distribution; and deriving total man hours for modification by producing an estimate table from the received information and the modification distribution number.

Specifically, in order to solve the above-mentioned problems, the above objects of the invention can be achieved by employing novel and advantageous means according the following super ordinate and subordinate concepts described below.

Specifically, a first feature of the method of the present invention is to employ a software modification estimate method of calculating total man hours of software modification prior to modification work based on an initial data group being numerical data serving as an index of a modification degree which is preset in a terminal, and an estimate element group being numerical data indicating contents of modification newly input to through terminal by a user, when development by modification of existing software is performed for software development, the software modification estimate method comprising: an input data recognition sequence of recognizing the estimate element group input to the terminal by the user; a modification scale distribution table generation sequence of generating, as a modification scale distribution table, a table indicating a relationship between the initial data group and a modification net scale numerically expressed from an actual modification sale included in the estimate element group, and analyzing the modification scale distribution table to derivate a distribution number of modification parts present in each development unit in the modification development; an estimate table generation sequence of calculating a development scale, which is a product amount produced by the modification, and a productivity produced by the modification, based on the estimate element group, the distribution number, and the modification net scale; generating, as an estimate table, a contrast among the development scale, the productivity, and the estimate element group; and estimating a man-hour of the modification based on the estimate table; a data receiving/transmitting sequence of receiving and transmitting an appropriate data group among the initial data groups held in the terminal in response to a call from the table generation sequence when the modification scale distribution table and the estimate table are generated; and an output sequence of visually displaying the derived estimate result and the respective tables generated in the modification scale distribution table generation sequence and the estimate table generation sequence.

A second feature of the method of the present invention is to employ a software modification estimate method, wherein in the modification scale distribution table in the above-mentioned first feature of the method of the present invention, modification target ranges obtained by dividing a range of a modification target by an arbitrary number and assigning numbers are set as a horizontal axis and a modification distribution degree indicating a ratio of a modification distribution number in which distribution states of the modification parts are supposed in a scale of a modification base, a scale of a modification unit, a modification part number, and the modification base is set as a vertical axis, and wherein the modification scale distribution table is generated by applying numerical values to the modification scale distribution table based on the estimate element group and the initial data group in the modification scale distribution table generation sequence.

A third feature of the method of the present invention is to employ a software modification estimate method, wherein the modification distribution number in the above-mentioned first or second feature of the method of the present invention, is determined as a number suitable for a modification base proficiency degree obtained by setting the modification target range, the modification distribution degree, and a proficiency of the modification base to have an arbitrary value, by matching the modification net scale in blocks with the modification scale distribution table when the modification base is separated by an arbitrary number to form blocks.

A fourth feature of the method of the present invention is to employ a software modification estimate method, wherein the development scale in the above-mentioned first feature of the method of the present invention, is calculated using Expression $V_{ijk}=(q_i \times f_{ijk}) \times (1+\alpha+\alpha')$ on the assumption that $V_{ijk}$ is the development scale, $q_i$ is the modification net scale, $f_{ijk}$ is the modification distribution number, $\alpha$ is an environment variable indicating an influence degree on the amount of product in executing the software development included in the initial data group, and $\alpha'$ is an environment variable indicating an influence degree on the amount of product just in executing software modification development.

A fifth feature of the method of the present invention is to employ a software modification estimate method, wherein the productivity in the above-mentioned first feature of the method of the present invention, is calculated using Expression $P_{ijk}=PB \times (1+K_{ijk}) \times (1+\beta+\beta')$ on the assumption that $P_{ijk}$ is the productivity, PB is a productivity which is arbitrarily set as a reference of the software development included in the initial data group, $K_{ijk}$ is an influence degree to which the proficiency degree of the modification base included in the initial data group has an influence on the productivity, $\beta$ is an environment variable indicating an influence degree on the productivity included in the initial data group in executing the software development, and $\beta'$ is an environment variable indicating an influence degree on the productivity just in executing software modification development.

A sixth feature of the method of the present invention is to employ a software modification estimate method, wherein in the estimate table in the above-mentioned first, fourth or fifth feature of the method of the present invention, modification target ranges obtained by dividing a range of a modification target by an arbitrary number and assigning numbers are set as a horizontal axis and a modification distribution degree including a modification distribution number in which distribution states of the modification parts are supposed in a scale of a modification base, a scale of a modification unit, a modification part number, and the modification base is set as a vertical axis, and wherein on the vertical axis, the man-hour calculated by multiplying the development scale, the influence degree, and the development sale by the productivity is included as an element.

A seventh feature of the method of the present invention is to employ a software modification estimate method, wherein the total man hours in the above-mentioned first, fourth, fifth or sixth feature of the method of the present invention, is calculated using Expression $H=\Sigma i \Sigma j \Sigma k (V_{ijk} \times P_{ijk})$ on the assumption that H is the total man hours, i is the modification density number, j is the modification distribution degree number, and k is the modification base proficiency value.

A first feature of the system of the present invention is to employ a software modification estimate system that calculate the total man hours performed in software modification prior to modification work based on an initial data group, which is numerical data serving as an index of a modification degree preset in a terminal, and an estimate element group, which is numerical data indicating contents of the modification newly input to the terminal by a user, when modification of existing software is developed in software development, the software modification estimate system comprising: input/output means including input means for inputting an estimate element group serving as information used for modification estimate by a user estimating the software modification and output means for visually confirming the calculated estimate result; modification scale distribution table generation means for generating, as a modification scale distribution table, a table indicating a relationship between the initial data group and a modification net scale numerically expressed from an actual modification scale included in the estimate element group, analyzing the modification scale distribution table, and deriving a distribution number of modification parts present in each development unit in the modification development; estimate table generation means for calculating a development scale, which is a product amount produced in the modification, and a productivity produced in the modification based on the estimate element group, generating, as an estimate table, a contrast among the development scale, the productivity, and the estimate element group, and estimating the total man hours of the modification based on the estimate table; and a database storing preset fixed values necessary for generating the modification scale distribution table and the estimate table and transmitting and receiving the values in response to a call from the modification scale distribution table generation means and the estimate table generation means.

A second feature of the system of the present invention is to employ a software modification estimate system, wherein in the modification scale distribution table in the above-mentioned first feature of the system of the present invention, modification target ranges obtained by dividing a range of a modification target by an arbitrary number and assigning numbers are set as a horizontal axis and a modification distribution degree indicating a ratio of a modification distribution number in which distribution states of the modification parts are supposed in a scale of a modification base, a scale of a modification unit, a modification part number, and the modification base is set as a vertical axis, and wherein the modification scale distribution table is generated by applying numerical values to the modification scale distribution table based on the estimate element group and the initial data group in the modification scale distribution table generation sequence.

A third feature of the system of the present invention is to employ a software modification estimate system, wherein the modification distribution number in the above-mentioned first or second feature of the system of the present invention, is determined as a number suitable for a modification base proficiency degree obtained by setting the modification target range, the modification distribution degree, and a proficiency of the modification base to have an arbitrary value, by matching the modification net scale in blocks with the modification scale distribution table when the modification base is separated by an arbitrary number to form blocks.

A four feature of the system of the present invention is to employ a software modification estimate system, wherein the estimate table calculation means in the above-mentioned first feature of the system of the present invention, includes development scale calculation means for calculating the development scale using Expression $V_{ijk}=(q_i \times f_{ijk}) \times (1+\alpha+\alpha')$ on the assumption that $V_{ijk}$ is the development scale, $q_i$ is the modification net scale, $f_{ijk}$ is the modification distribution number, α is an environment variable indicating an influence degree on the amount of product in executing the software development included in the initial data group, and α' is an environment variable indicating an influence degree on the amount of product just in executing software modification development.

A fifth feature of the system of the present invention is to employ a software modification estimate system, wherein the estimate table generation means in the above-mentioned first or fourth feature of the system of the present invention, includes productivity calculation means calculating the productivity using Expression $P_{ijk}=PB \times (1+K_{ijk}) \times (1+\beta+\beta')$ on the assumption that $P_{ijk}$ is the productivity, PB is a productivity which is arbitrarily set as a reference of the software development included in the initial data group, $K_{ijk}$ is an influence degree to which the proficiency degree of the modification base included in the initial data group has an influence degree on the productivity, β is an environment variable indicating an influence on the productivity in executing the software development, and β is an environment variable indicating an influence degree on the productivity just in executing software modification development.

A sixth feature of the system of the present invention is to employ a software modification estimate system, wherein in the estimate table in the above-mentioned first, fourth or fifth feature of the system of the present invention, modification target ranges obtained by dividing a range of a modification target by an arbitrary number and assigning numbers are set as a horizontal axis and a modification distribution degree including a modification distribution number in which distribution states of the modification parts are supposed in a scale of a modification base, a scale of a modification unit, a modification part number, and the modification base is set as a vertical axis, and wherein on the vertical axis, the man-hour calculated by multiplying the development scale, the influence degree, and the development scale by the productivity is included as an element.

A seven feature of the system of the present invention is to employ a software modification estimate system, wherein the estimate table generation means in the above-mentioned first, fourth, fifth or sixth feature of the system of the present invention, includes total man hours calculation means calculating the total man hours using Expression $H=\Sigma i \Sigma j \Sigma k (V_{ijk} \times P_{ijk})$ on the assumption that H is the total man hours, i is the modification target range number, j is the modification distribution degree number, and k is the modification base proficiency number.

Effects of the Invention

According to the invention, it is possible to estimate total man hours incurred from modification in a modification preparation step, in modifying existing software.

Moreover, since the periphery functions involved in the modification can also be estimated, it is possible to estimate man hours related to parts that are not proportional to the modified parts or the modification amount.

BRIEF DESCRIPTION OF THE DRAWINGS

FIG. 2 is a diagram illustrating an example of a modification scale distribution table used to derive a modification distribution numbers according to the invention.

FIG. 3 is a diagram illustrating an example of an estimate table G2 used to derive total man hours according to the invention.

BRIEF DESCRIPTION OF LETTERS AND NUMERALS

Figure 1:
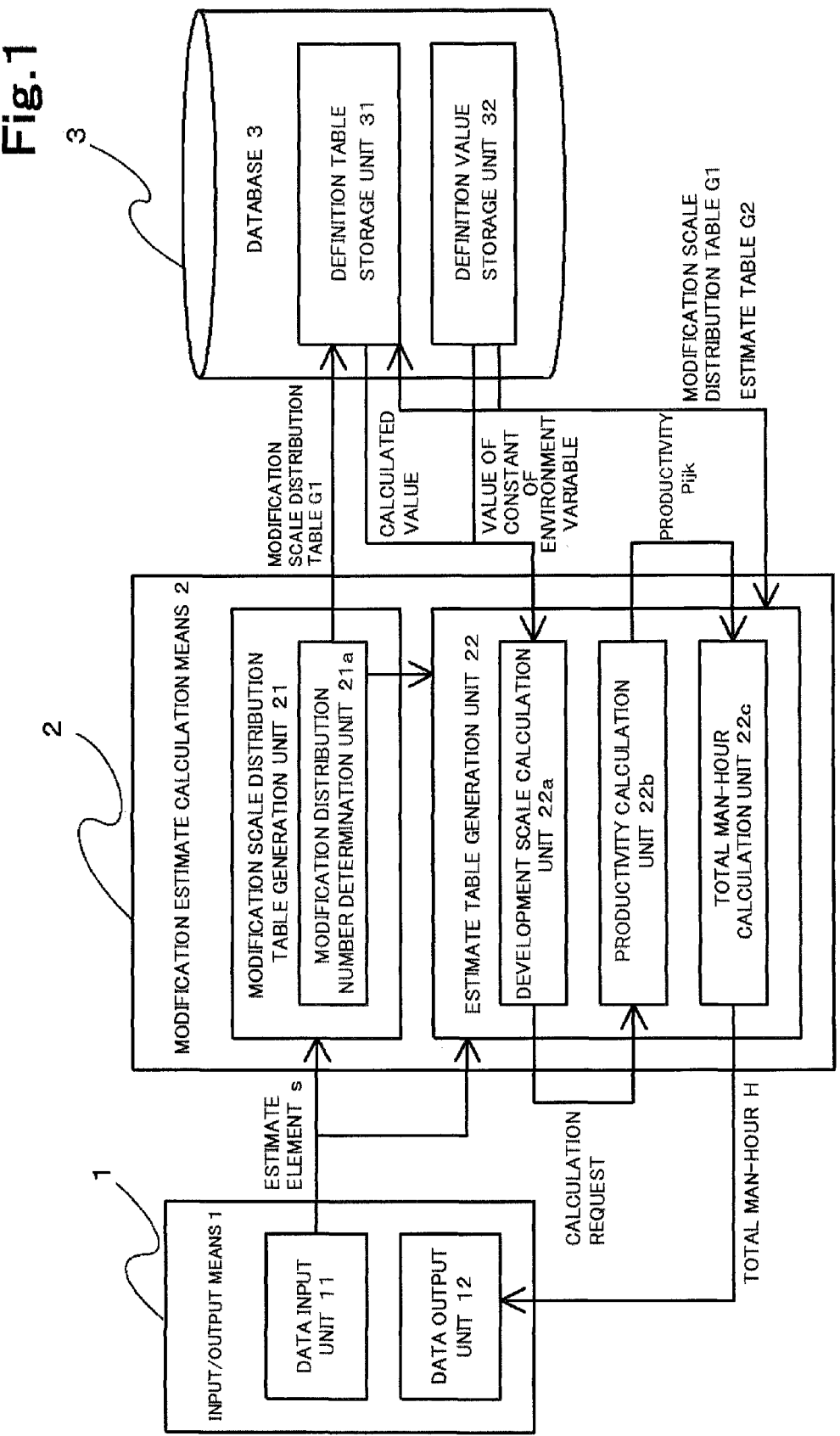
FIG. 1 is a diagram illustrating the system configuration of a software modification estimate system according to the invention.

1: INPUT/OUTPUT MEANS
11: DATA INPUT UNIT
12: DATA OUTPUT UNIT
2: MODIFICATION ESTIMATE CALCULATION MEANS
21: MODIFICATION SCALE DISTRIBUTION TABLE GENERATION UNIT
21a: MODIFICATION DISTRIBUTION NUMBER DETERMINATION UNIT
22: ESTIMATE TABLE GENERATION UNIT
22a: DEVELOPMENT SCALE CALCULATION UNIT
22b: PRODUCTIVITY CALCULATION UNIT
22c: TOTAL MAN-HOUR CALCULATION UNIT
3: DATABASE
31: DEFINITION TABLE STORAGE UNIT
32: DEFINITION VALUE STORAGE UNIT
s: ESTIMATE ELEMENT
VB: MODIFICATION BASE SCALE
PB: BASELINE PRODUCTIVITY
KB: MODIFICATION BASE EXPERIENCE YEAR
q, $q_i$: MODIFICATION NET SCALE
f: MODIFICATION DISTRIBUTION REGION NUMBER
i: MODIFICATION DENSITY NUMBER
j: MODIFICATION DISTRIBUTION DEGREE NUMBER
k: MODIFICATION BASE PROFICIENCY NUMBER
z: MODIFICATION TARGET SCALE
KS: MODIFICATION NET AMOUNT
$f_{ijk}$: MODIFICATION DISTRIBUTION NUMBER
$K_{ijk}$: MODIFICATION PROFICIENCY INFLUENCE DEGREE
$V_{ijk}$: DEVELOPMENT SCALE
$P_{ijk}$: PRODUCTIVITY
$H_{ijk}$: MAN-HOUR
H: TOTAL MAN-HOUR
G1: MODIFICATION SCALE DISTRIBUTION TABLE
G2: ESTIMATE TABLE
α: GENERAL PRODUCT AMOUNT ENVIRONMENT VARIABLE
α': MODIFICATION PRODUCT AMOUNT ENVIRONMENT VARIABLE
β: GENERAL PRODUCTIVITY ENVIRONMENT VARIABLE
β: MODIFICATION PRODUCTIVITY ENVIRONMENT VARIABLE

BEST MODE FOR CARRYING OUT THE INVENTION

Hereinafter, a system according to an exemplary embodiment will be described with reference to the accompanying drawings.

(Exemplary System)

FIG. 1 is a diagram illustrating the functional configuration of the software modification estimate system corresponding to the exemplary system.

As shown in the same figure, a software modification estimate system relating to this system example includes input/output means 1 configured to input and output an estimate element serving as information necessary for modification, modification estimate calculation means 2 configured to analyze a modification requirement based on the information received from the input/output means 1 and quantify a fluctuation of productivity in the modification, and a database 3 holding data necessary for analysis of the modification estimate calculation means 2 and an analysis result.

Here, the input/output means 1, the modification estimate calculation means 2, and the database 3 may all be mounted in a terminal such as a personal computer. Alternatively, the input/output means 1, the modification estimate calculation means 2, and the database 3 may each be mounted in different terminals and may be connected to communicate with each other via an Internet line or a dedicated line.

The input/output means 1 which is a constituent element of the system according to the invention is required to satisfy a condition of having a function of transmitting an estimate element s that indicates a modification requirement to the modification estimate calculation means 2 when existing software is modified, a function of receiving a fluctuation of the productivity transmitted after the modification estimate calculation means 2 calculates total man hours, a data input unit 11 performing input of necessary information, and a data output unit 12 displaying a result. For this, a personal computer or a terminal device such as a PDA or the like which satisfy the conditions is used. The details of data included in the estimate element s will be described below.

The modification estimate calculation means 2 is a calculation function unit configured to receive the estimate element s transmitted from the input/output unit 1, analyze the modification requirement based on the data, and calculate total man hours of modification in the form of numerical values. Used is a system having the calculation function of each calculation function unit in the modification estimate calculation unit 2 described below.

The database 3 is a database that holds the analysis result of the modification estimate calculation means 2 in each calculation function unit and numerical data based on the analysis. The database 3 has a function of receiving and storing the data from the modification estimate calculation means 2 and transmitting the data to the modification estimate calculation means 2 in response to a request of the modification estimate calculation means 2. The details of the function will be described.

Next, there will be described the estimate element s transmitted from the input/output means 1 to the modification estimate calculation means 2 of the system according to the invention, the detailed calculation function unit of the modification estimate calculation means 2, and the concept of the data maintained in the database 3.

The estimate element s input to the input/output means 1 by a user includes information regarding the existing system which is a modification base and a modification requirement. The estimate element s includes data such as a modification base scale VB, a modification base experience year KB, and a baseline productivity PB, which are the information regarding the existing system, and data such as a modification net scale q and a modification distribution region number f which are the modification requirement.

Next, the calculation function units included in the modification estimate calculation means 2 will be described. As shown in FIG. 1, the modification estimate calculation means 2 includes a modification scale distribution table generation unit 21 that includes a modification distribution number determination unit 21a and an estimate table generation unit 22 that includes a development scale calculation unit 22a, a productivity calculation unit 22b, and a total man-hour calculation unit 22c. Hereinafter, the concept of each calculation function unit will be described.

The modification scale distribution table generation unit 21 is a function unit generating, based on the estimate element s, a modification scale distribution table G1 which is a matrix table indicating a relationship of a modification density number i, a modification distribution degree number j, and a modification base proficiency number k.

The modification distribution number determination unit 21a of the modification scale distribution table generation unit 21 is a function unit that determine a modification distribution number $f_{ijk}$ based on the modification density number i, the modification distribution degree number j, and the modification base proficiency number k determined during generation of the modification scale distribution table G1. The modification distribution number determination unit 21a has a function of determining modification distribution number $f_{ijk}$ (frequency) present in each range when the modification scale distribution table G1 is completed using the estimate element s, and then reflecting the value to the modification scale distribution table G1.

Figure 2:
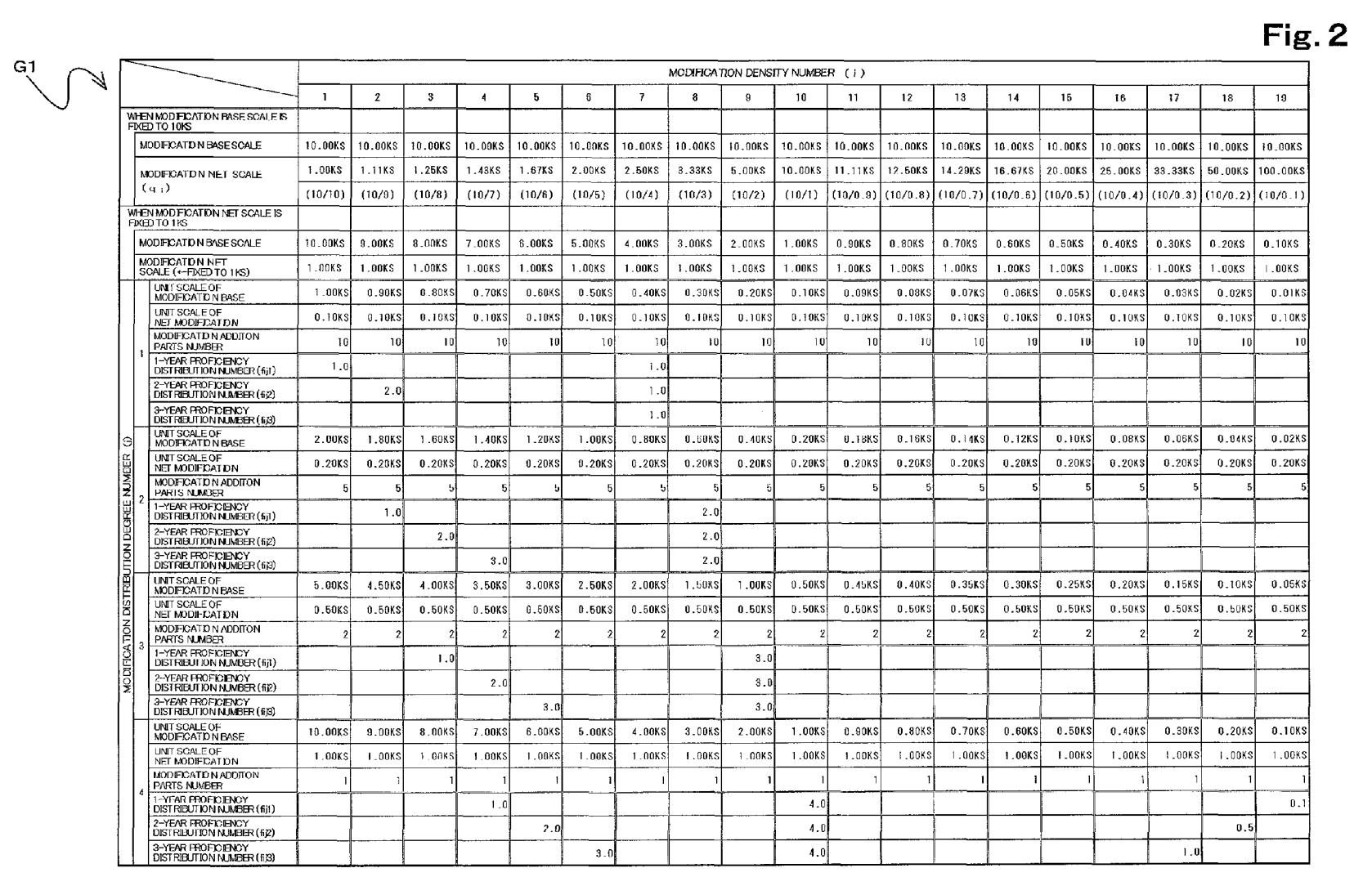

The generated modification scale distribution table G1 is stored in the definition table storage unit 31 of the database 3 so that the table may be used when reexamination is necessary during the modification. FIG. 2 is a diagram illustrating a specific example of the modification scale distribution table G1. The details of the table will be described in an embodiment described below.

The estimate table generation unit 22 is a function unit that numerically derives a fluctuation of the modification based on the modification scale distribution table G1 and generates this fluctuation as an estimate table G2. The estimate table generation unit 22 includes, as calculation units of the data necessary for generating the estimate table G2, the development scale calculation unit 22a that calculates a development scale $V_{ijk}$ representing the scale of development, the productivity calculation unit 22b that calculates a productivity $P_{ijk}$, and the total man-hour calculation unit 22c that calculates a total man-hour H executed in the modification.

The development scale calculation unit 22a is a function unit calculating a development scale $V_{ijk}$ from a modification net scale $q_i$, a modification distribution number $f_{ijk}$, a general product amount environment variable $\alpha$, and a modification product amount environment variable $\alpha'$. The development scale $V_{ijk}$ is derived using Expression 1.

Expression 1

$$V_{ijk} = (q_i \times f_{ijk}) \times (1 + \alpha + \alpha') \qquad (1)$$

Here, the general product amount environment variable $\alpha$ and the modification product amount environment variable $\alpha'$ are numerical values that are used as parameters absorbing a fluctuation of the amount of product by a difference in a development environment or the degree of a quality request. An environment variable common to new development and modification development is assumed to be the general product amount environment variable $\alpha$ and an environment variable unique to the modification development is assumed to be the modification product amount environment variable $\alpha'$.

The values of the general product amount environment variable $\alpha$ and the modification product amount environment variable $\alpha'$ may be input as the estimate element s by the user. Alternatively, the definition value storage unit 32 of the database 3 may store the data and the development scale calculation unit 22a may extract the values from the database 3 in a calculation step.

The productivity calculation unit 22b is a function unit that calculates a productivity $P_{ijk}$ from the baseline productivity PB representing the productivity when the new development is executed, a modification proficiency influence degree $K_{ijk}$, which is a coefficient used to correct the modification development productivity, a general productivity environment variable β, and a modification productivity environment variable β'. The value of the productivity is derived using Expression 2.

Expression 2

$$P_{ijk} = PB \times (1 K_{ijk}) \times (1+\beta+\beta') \quad (2)$$

The general productivity environment variable β and the modification productivity environment variable β' are numerical values that are used as parameters absorbing a fluctuation of productivity by a difference in a development environment or the degree of a quality request. An environment variable common to new development and modification development is assumed to be the general environment variable β and an environment variable unique to the modification development is assumed to be the modification product amount environment variable β'.

The modification proficiency influence degree $K_{ijk}$ is a coefficient that is used to correct the productivity of the modification development. The values of the modification proficiency influence degree are stored in advance as a fixed value in the definition value storage unit 32 and are called in sequence when necessary for calculating the productivity.

As in the values of the general product amount environment variable α and the modification product amount environment variable α', the general productivity environment variable β and the modification productivity environment variable β' may be input as the estimate element s by the user at the inputting time. Alternatively, the definition value storage unit 32 may store the data and productivity calculation unit 22b may extract the values from the definition value storage unit 32 in the calculation step.

The total man-hour calculation unit 22c is a function unit that calculates the total man-hour H from the derived development scale $V_{ijk}$ and the productivity $P_{ijk}$. The total man-hour calculation unit 22c derives the man-hour $H_{ijk}$ using Expression 3 and derives the total man-hour H by the development modification using Expression 4.

Expression 3

$$H_{ijk} = V_{ijk} \times P_{ijk} \quad (3)$$

Expression 4

$$H = \Sigma_i \Sigma_j \Sigma_k (V_{ijk} \times P_{ijk}) \quad (4)$$

The estimate table generation unit 22 generates the estimate table G2, makes a request for calculation to each calculation unit when the development scale $V_{ijk}$, the productivity $P_{ijk}$, and the total man-hour H are necessary for generating the table, and completes the estimate table G2 by deriving the values.

The generated estimate table G2 is stored in the definition table storage unit 31. The estimate table is used when reexamination is executed during the modification. FIG. 3 is a diagram illustrating a specific example of the estimation table G2. The details thereof will be described in an embodiment described below.

The configuration of each calculation means of the specification modification estimate calculation means 2 has hitherto been described.

Embodiment

Next, the above-described system according to an embodiment of the present invention will be described with reference to the system configuration shown in FIG. 1 and the tables shown in FIGS. 2 and 3. In this embodiment, specific numerical values will be used to clarify description. However, the invention is not limited to the numerical values. The numerical values may appropriately be changed depending on the situation of the modification development.

First, a user inputs the modification base scale VB, the modification base experience year KB, the modification net scale q, and the modification distribution region number f in the modification development as the estimate elements s from the data input unit 11 of the input/output means 1, such as a keyboard.

The user transmits the estimate elements s determined to be input to the modification scale distribution table generation unit 21 of the modification estimate calculation means 2.

The modification scale distribution table generation unit 21 separates the number of lines of the existing source code of the modification base scale VB per 10 KS unit and sets a block.

Next, the modification scale distribution table generation unit 21 generates the modification scale distribution table G1 based on the estimate elements s.

When the details of the modification scale distribution table G1 are described, modification target range numbers i of 1 to 19 are set as the numbers indicating the range of a modification target on the horizontal axis in this embodiment.

In order to set the modification amount of each range, the modification base scale VB and the modification net scale q included in the estimate elements s are analyzed, the modification base scale VB is separated to a modification target scale z in each range for each 10 KS, and the modification net scale q is set as the modification net scale $q_i$ of each range and is written in the table.

Here, the modification target scale z has no fixed value and the modification net scale $q_i$ has a fixed value. When the modification net scale $q_i$ is fixed to 1 KS, the value of the modification target scale z is varied in accordance with the modification net scale $q_i$.

When the modification density number i, the modification target scale z, and the modification net scale $q_i$ are determined, the modification net scale $q_i$ of each range is separated into several regions and is added based on the modification distribution region number f of the estimate elements s and the modification distribution degree number j is set in the vertical axis of the table.

In the modification distribution degree number j, the modification distribution region number f is applied in the table based on the scale of the modification target for each unit, the scale of the modification addition for each unit, and the estimate elements s set in advance as a fixed value.

When the modification scale distribution table G1 is generated through the above-described setting, the modification scale distribution table generation unit 21 gives a request to the modification distribution number determination unit 21a to analyze an element of each block and determine the modification distribution number $f_{ijk}$.

The modification distribution number determination unit 21a first derives the modification net amount (KS) of the block to be analyzed using the modification net scale q and determines the modification density number i from the modification scale distribution table G1.

Next, the modification distribution degree number j which is the distribution region of the addition part in the block to be analyzed is determined using the modification distribution region number f. In this embodiment, when the addition is executed in ten regions, the modification distribution degree number j=1 is set. When the addition is executed in five regions, the modification distribution degree number j=2 is set. When the addition is executed in two regions, the modification distribution degree number j=3 is set. When the addition is executed only in a one region, the modification distribution degree number j=4 is set.

Moreover, the modification base proficiency number k which is the modification base experience value in the block to be analyzed is determined using the modification base experience year KB. In this embodiment, k=1 is set for one year or less, k=2 is set for a year more than one year to three years or less, and k=3 is set for years more than three years.

When the modification density number i, the modification distribution degree number j, and the modification base proficiency number k are determined, the modification distribution number determination unit 21a derives the number suitable for the modification scale distribution table G1 and determines a value counted by repeating the sequence for each block as the modification distribution number $f_{ijk}$.

Next, the processing details of the estimation table generation unit 22 will be described using an example of the estimate table G2 shown in FIG. 3. First, the estimation table generation unit 22 generates the estimate table G2 based on the value derived by the modification distribution number determination unit 21a in order to calculate the total man hours of the modification.

In the estimate table G2, as in the modification scale distribution table G1, the modification density numbers i are set in the range from 1 to 19 in the horizontal axis and the modification distribution degree number j is separated and set into four ranges in the vertical axis.

The value stored in advance in the definition value storage unit 32 is derived as the modification proficiency influence degree $K_{ijk}$ which is a coefficient used to correct the productivity for the modification development.

Next, the estimate table generation unit 22 requests the development scale calculation unit 22a to calculate the development scale $V_{ijk}$.

The development scale calculation unit 22a acquires the values of the modification net scale $q_i$ and the modification distribution number $f_{ijk}$ from the modification scale distribution table G1 stored in the definition table storage unit 31, extracts the general product amount environment variable α and modification product amount environment variable α' stored in the definition value storage unit 32, repeatedly calculates the development scale $V_{ijk}$ for the respective values of the modification density number i, the modification distribution degree number j, and the modification base proficiency number k using Expression 1, and adds the values to the estimate table G2.

In the example shown in FIG. 3, when the general product amount environment variable α and modification product amount environment variable α' stored in the definition value storage unit 32 are 0.10 and 0.05, respectively, in calculating development scale $V_{i11}$ which is the modification scale corresponding to a one-year proficiency degree, firstly the modification net scale $q_i$ obtained when the modification density number i and the modification distribution degree number j are each 1 and the one-year proficiency distribution number $f_{ijk}$ are derived from the modification scale distribution table G1. At this time, the modification net scale $q_i$ is 1.0 (KS) and the one-year proficiency distribution number $f_{ijk}$ is 1.0. Therefore, when these values are applied to Expression 1, the development scale $V_{i11}$ is calculated as 1.15 (KS).

When the calculation ends, the modification density number i and the modification distribution degree number j of the estimate table G2 are each 1. When the modification distribution degree number j is 1, the calculated value $V_{i11}$=1.15 (KS) is applied to the position of the development scale $V_{i11}$.

In this way, when the modification density number i is 1 to 19, the modification distribution degree number j is 1 to 4, the modification base proficiency number k is 1 to 3, the development scale $V_{ijk}$ is calculated and added to the estimate table G2.

When the development scale calculation unit 22a completely writes the development scale $V_{ijk}$ to the estimate table G2, the estimate table generation unit 22 requests the productivity calculation unit 22b to calculate the productivity $P_{ijk}$.

The productivity calculation unit 22b extracts the baseline productivity PB included in the estimate element s, the general productivity environment variable β and the modification productivity environment variable β' stored in the definition value storage unit 32, and the modification proficiency influence degree $K_{ijk}$. The productivity calculation unit 22b calculates the productivity $P_{ijk}$ for the respective values of the modification density number i, the modification distribution degree number j, and the modification base proficiency number k using Expression 2.

The modification proficiency influence degree $K_{ijk}$ may be received from the definition value storage unit 32, when the productivity $P_{ijk}$ is calculated. However, when the modification estimate calculation means 22 generates the estimate table G2, the values of the modification proficiency influence degree $K_{ijk}$ may be written.

When the productivity $P_{ijk}$ is generated, the total man-hour calculation unit 22c receives the productivity $P_{ijk}$ from the productivity calculation unit 22b, derives the development scale $V_{ijk}$ corresponding to the values of the modification density number i, the modification distribution degree number j, a modification experience degree, and the modification base proficiency number k for the productivity $P_{ijk}$ from the estimate table G2, calculates the man-hour $H_{ijk}$ using Expression 3, and writes the result to the estimate table G2.

The total man-hour calculation unit 22c calculates the total man-hour H using Expression 4 from the all of the man-hour $H_{ijk}$ written to the estimate table G2 and transmits the total man-hour H to the input/output means 1 and the definition value storage unit 32.

The output means 12 of the input/output means 1 receiving the value displays the calculation result on a display apparatus such as a monitor including the input/output means 1 so that the user can visually confirm the estimate of the total man-hour H in the modification of the software.

Not only the total man-hour H but also the calculation results of the respective function units may be stored in the definition value storage unit 32. Therefore, since only the data is extracted for the estimate completely calculated once without calculation in the previous request, the modification estimate calculation means 2 can derive data necessary for a data extraction request from the definition value storage unit 32 by transmitting the data extraction request as the estimate element s and transmit the data to the output means 12 without using the calculation units 22a to 22c.

The specification modification estimate system according to the embodiment of the invention has hitherto been described. However, the invention is not limited to the above-described means, but may be modified within the scope of the invention as long as the above-described advantages can be obtained.

The invention claimed is:

1. A processor-implemented software modification estimate method of calculating total man hours of software modification prior to modification work based on an initial data group being numerical data serving as an index of a modification degree which is preset in a terminal, and an estimate element group being numerical data indicating contents of modification newly input to through terminal by a user, when development by modification of existing software is performed for software development, the software modification estimate method comprising:

an input data recognition sequence of recognizing the estimate element group input to the terminal by the user;

a modification scale distribution table generation sequence of generating, as a modification scale distribution table, a table indicating a relationship between the initial data group and a modification net scale numerically expressed from an actual modification sale included in the estimate element group, and analyzing the modification scale distribution table to derivate a distribution number of modification parts present in each development unit in the modification development;

an estimate table generation sequence of calculating a development scale, which is a product amount produced by the modification, and a productivity produced by the modification, based on the estimate element group, the distribution number, and the modification net scale; generating, as an estimate table, a contrast among the development scale, the productivity, and the estimate element group; and estimating a man-hour of the modification based on the estimate table;

a data receiving/transmitting sequence of receiving and transmitting an appropriate data group among the initial data groups held in the terminal in response to a call from the table generation sequence when the modification scale distribution table and the estimate table are generated; and an output sequence of visually displaying the derived estimate result and the respective tables generated in the modification scale distribution table generation sequence and the estimate table generation sequence, wherein the modification distribution number is determined as a number suitable for a modification base proficiency degree obtained by setting the modification target range, the modification distribution degree, and a proficiency of the modification base to have an arbitrary value, by matching the modification net scale in blocks with the modification scale distribution table when the modification base is separated by an arbitrary number to form blocks.

2. The software modification estimate method according to claim 1, wherein in the modification scale distribution table, modification target ranges obtained by dividing a range of a modification target by an arbitrary number and assigning numbers are set as a horizontal axis and a modification distribution degree indicating a ratio of a modification distribution number in which distribution states of the modification parts are supposed in a scale of a modification base, a scale of a modification unit, a modification part number, and the modification base is set as a vertical axis, and wherein the modification scale distribution table is generated by applying numerical values to the modification scale distribution table based on the estimate element group and the initial data group in the modification scale distribution table generation sequence.

3. The software modification estimate method according to claim 2, wherein the modification distribution number is determined as a number suitable for a modification base proficiency degree obtained by setting the modification target range, the modification distribution degree, and a proficiency of the modification base to have an arbitrary value, by matching the modification net scale in blocks with the modification scale distribution table when the modification base is separated by an arbitrary number to form blocks.

4. The software modification estimate method according to claim 1, wherein the development scale is calculated using Expression $V_{ijk}=(q_i \times f_{ijk}) \times (1+\alpha+\alpha')$ on the assumption that $V_{ijk}$ is the development scale, $q_i$ is the modification net scale, $f_{ijk}$ is the modification distribution number, $\alpha$ is an environment variable indicating an influence degree on the amount of product in executing the software development included in the initial data group, and $\alpha'$ is an environment variable indicating an influence degree on the amount of product just in executing software modification development.

5. The software modification estimate method according to claim 1, wherein the productivity is calculated using Expression $P_{ijk}=PB \times (1+K_{ijk}) \times (1+\beta+\beta')$ on the assumption that $P_{ijk}$ is the productivity, PB is a productivity which is arbitrarily set as a reference of the software development included in the initial data group, $K_{ijk}$ is an influence degree to which the proficiency degree of the modification base included in the initial data group has an influence on the productivity, $\beta$ is an environment variable indicating an influence degree on the productivity included in the initial data group in executing the software development, and $\beta'$ is an environment variable indicating an influence degree on the productivity just in executing software modification development.

6. The software modification estimate method according to claim 1, wherein in the estimate table, modification target ranges obtained by dividing a range of a modification target by an arbitrary number and assigning numbers are set as a horizontal axis and a modification distribution degree including a modification distribution number in which distribution states of the modification parts are supposed in a scale of a modification base, a scale of a modification unit, a modification part number, and the modification base is set as a vertical axis, and wherein on the vertical axis, the man-hour calculated by multiplying the development scale, the influence degree, and the development sale by the productivity is included as an element.

7. The software modification estimate method according to claim 1, wherein the total man hours is calculated using Expression $H=\Sigma i \Sigma j \Sigma k (V_{ijk} \times P_{ijk})$ on the assumption that H is the total man hours, i is the modification density number, j is the modification distribution degree number, and k is the modification base proficiency value.

8. A software modification estimate system having a processor that calculates the total man hours performed in software modification prior to modification work based on an initial data group, which is numerical data serving as an index of a modification degree preset in a terminal, and an estimate element group, which is numerical data indicating contents of the modification newly input to the terminal by a user, when modification of existing software is developed in software development, the software modification estimate system comprising:

input/output means including input means for inputting an estimate element group serving as information used for modification estimate by a user estimating the software modification and output means for visually confirming the calculated estimate result;

modification scale distribution table generation means for generating, as a modification scale distribution table, a table indicating a relationship between the initial data group and a modification net scale numerically expressed from an actual modification scale included in the estimate element group, analyzing the modification scale distribution table, and deriving a distribution number of modification parts present in each development unit in the modification development;

estimate table generation means for calculating a development scale, which is a product amount produced in the modification, and a productivity produced in the modification based on the estimate element group, generating, as an estimate table, a contrast among the development scale, the productivity, and the estimate element group, and estimating the total man hours of the modification based on the estimate table; and a database storing preset fixed values necessary for generating the modification scale distribution table and the estimate table and transmitting and receiving the values in response to a call from the modification scale distribution table generation means and the estimate table generation means, wherein the modification distribution number is determined as a number suitable for a modification base proficiency degree obtained by setting the modification target range, the modification distribution degree, and a proficiency of the modification base to have an arbitrary value, by matching the modification net scale in blocks with the modification scale distribution table when the modification base is separated by an arbitrary number to form blocks.

9. The software modification estimate system according to claim 8, wherein in the modification scale distribution table, modification target ranges obtained by dividing a range of a modification target by an arbitrary number and assigning numbers are set as a horizontal axis and a modification distribution degree indicating a ratio of a modification distribution number in which distribution states of the modification parts are supposed in a scale of a modification base, a scale of a modification unit, a modification part number, and the modification base is set as a vertical axis, and wherein the modification scale distribution table is generated by applying numerical values to the modification scale distribution table based on the estimate element group and the initial data group in the modification scale distribution table generation sequence.

10. The software modification estimate system according to claim 9, wherein the modification distribution number is determined as a number suitable for a modification base proficiency degree obtained by setting the modification target range, the modification distribution degree, and a proficiency of the modification base to have an arbitrary value, by matching the modification net scale in blocks with the modification scale distribution table when the modification base is separated by an arbitrary number to form blocks.

11. The software modification estimate system according to claim 8, wherein the estimate table calculation means includes development scale calculation means for calculating the development scale using Expression $V_{ijk}=(q_i \times f_{ijk}) \times (1+\alpha+\alpha')$ on the assumption that $V_{ijk}$ is the development scale, $q_i$ is the modification net scale, $f_{ijk}$ is the modification distribution number, $\alpha$ is an environment variable indicating an influence degree on the amount of product in executing the software development included in the initial data group, and $\alpha'$ is an environment variable indicating an influence degree on the amount of product just in executing software modification development.

12. The software modification estimate system according to claim 11, wherein the estimate table generation means includes productivity calculation means calculating the productivity using Expression $P_{ijk}=PB \times (1+K_{ijk}) \times (1+\beta+\beta')$ on the assumption that $P_{ijk}$ is the productivity, PB is a productivity which is arbitrarily set as a reference of the software development included in the initial data group, $K_{ijk}$ is an influence degree to which the proficiency degree of the modification base included in the initial data group has an influence degree on the productivity, $\beta$ is an environment variable indicating an influence on the productivity in executing the software development, and $\beta'$ is an environment variable indicating an influence degree on the productivity just in executing software modification development.

13. The software modification estimate system according to claim 8, wherein the estimate table generation means includes productivity calculation means calculating the productivity using Expression $P_{ijk}=PB \times (1+K_{ijk}) \times (1+\beta+\beta')$ on the assumption that $P_{ijk}$ is the productivity, PB is a productivity which is arbitrarily set as a reference of the software development included in the initial data group, $K_{ijk}$ is an influence degree to which the proficiency degree of the modification base included in the initial data group has an influence degree on the productivity, $\beta$ is an environment variable indicating an influence on the productivity in executing the software development, and $\beta'$ is an environment variable indicating an influence degree on the productivity just in executing software modification development.

14. The software modification estimate system according to claim 8, wherein in the estimate table, modification target ranges obtained by dividing a range of a modification target by an arbitrary number and assigning numbers are set as a horizontal axis and a modification distribution degree including a modification distribution number in which distribution states of the modification parts are supposed in a scale of a modification base, a scale of a modification unit, a modification part number, and the modification base is set as a vertical axis, and wherein on the vertical axis, the man-hour calculated by multiplying the development scale, the influence degree, and the development scale by the productivity is included as an element.

15. The software modification estimate system according to claim 8, wherein the estimate table generation means includes total man hours calculation means calculating the total man hours using Expression $H=\Sigma i \Sigma j \Sigma k (V_{ijk} \times P_{ijk})$ on the assumption that H is the total man hours, i is the modification target range number, j is the modification distribution degree number, and k is the modification base proficiency number.

* * * * *